L. E. WATERMAN.
PLOW.
APPLICATION FILED OCT. 12, 1912.
1,063,928.
Patented June 3, 1913.
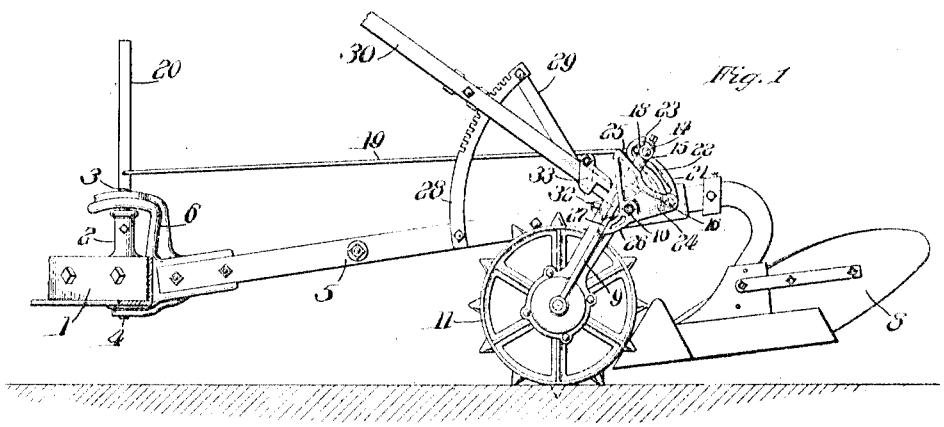
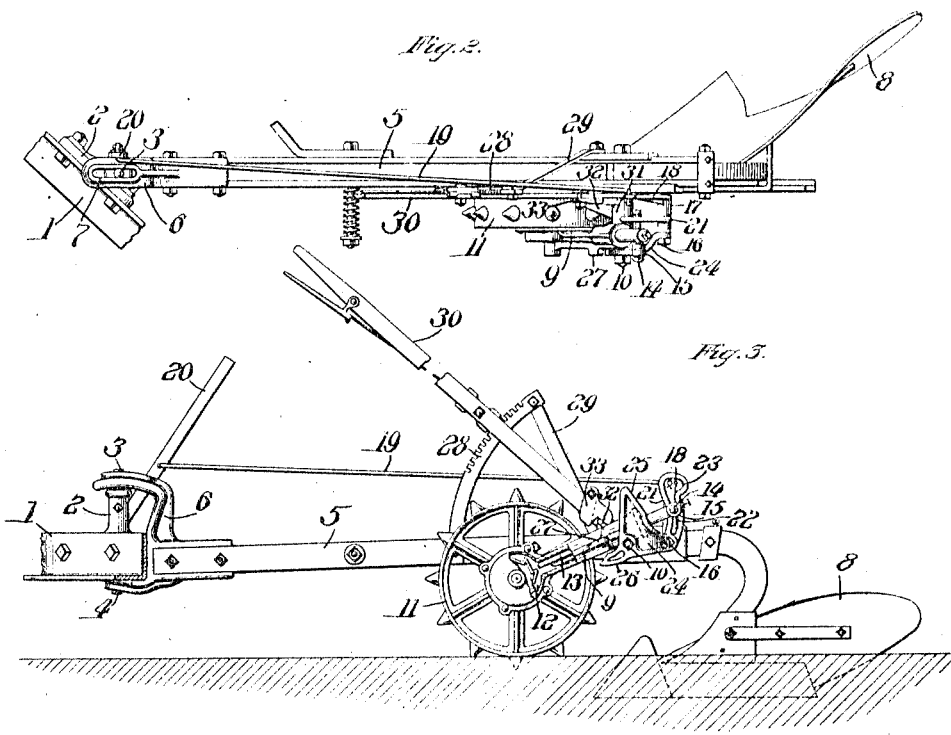
Witnesses:
John F. McCann Jr.
W. S. Jackson
Inventor:
Lewis E. Waterman
By A. O. Behel
Atty

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW.

1,063,928.  Specification of Letters Patent.  Patented June 3, 1913.

Application filed October 12, 1912.  Serial No. 725,520.

*To all whom it may concern:*

Be it known that I, LEWIS E. WATERMAN, a citizen of the United States, residing at Rockford, in the county of Winnebago and the State of Illinois, have invented certain new and useful Improvements in Plows, of which the following is a specification.

This invention relates to lift plows of the type adapted to have connection with a frame which is drawn by a traction engine, or suitable power.

The object of this invention is to form an improvement in the means for raising the plow and also to form a stop contacting the wheel-support, for limiting the raise of said plow.

In the accompanying drawing: Figure 1 is a side elevation of a plow, showing the plow in a raised position. Fig. 2 is a plan view of Fig. 1. Fig. 3 is a side elevation, showing the plow in its lowered working position, the supporting-wheel casing being partly broken away.

The main carrying frame 1 is adapted to be power drawn and to draw a plurality of plows if so desired, and carries a bracket 2 having the vertical upper and lower rigid studs 3 and 4, respectively. The plow beam 5 has bolted to its forward end a yoked bracket 6, the lower arm of the bracket receiving the stud 4 and the upper arm having a slot 7 adapted to receive the stud 3. The plow 8 is connected to the rear end of the beam 5.

The wheel-support 9 is pivotally connected to the beam 5 by the bolt 10, and a wheel 11 is rotatably carried by the wheel-support. The lower end of the support 9 is in the form of a recessed casing, within which is located a ratchet-wheel 12 that rotates with the wheel 11. The support 9 is tubular and carries a dog 13 which is adapted to be brought into and out of engagement with the ratchet-wheel 12, a coiled spring carried inside said support, not shown, exerting a force to hold the dog out of the ratchet-wheel. A pin passes through the upper end of the dog and supports a roller 15.

A bolt 16 is secured to the beam 5 and carries a sleeve 17, the sleeve carrying at one end an arm 18 which has a connection by the rod 19, with a hand lever 20 pivoted to the bracket 2; and at the other end an irregular shaped arm 21 which has formed therein, the cam groove 22 formed with the offset 23. The pin 14 is located in said cam groove 22.

The bracket 24 is rigidly carried by the bolts 10 and 16, and has the cam face 25 and depending stud or stop 26 which is adapted to contact a lug 27 formed with the wheel-support 9.

The toothed segment 28, braced by link 29, is rigidly carried by the beam 5, and the hand lever 30 which is pivotally supported by the bolt 10, carries a dog which engages the said toothed segment.

A lateral extension 31 of the wheel-support, Fig. 2, has formed therewith a projecting lug 32; and a catch 33, bolted to the lever 30, is adapted to contact said lug 32. The catch 33 is adjustable on the lever 30, so that when shipping a plow the catch can be moved higher up on the lever to allow the lever to be swung close to the beam.

The operation of the plow is as follows: With the plow elevated as in Fig. 1, by moving hand lever clockwise, the cam grooved arm 21 is moved clockwise, through means of rod 19 and arm 18, which movement causes the pin 14 to be carried from the offset 23 into the groove 22, thus allowing the wheel-support to pivot backward, the weight of the plow and beam effecting the movement, until the lug 32 contacts the catch 33; this position being the operative position of the plow.

The plow can be raised either by traction force or by manual force. When raising by traction force the lever 20 is moved forward, swinging the cam grooved arm 21 forward, this action of the cam grooved arm causing, through its engagement with the pin 14, the dog 13 to be brought into engagement with the ratchet-wheel 12. As the plow moves forward the wheel 11 is held stationary because of the said dog engagement, and the plow is lifted out of the ground, by the wheel-support being pivoted at 10 and the draft through beam 5 effecting the raising of the plow. As the wheel-support is being pivoted, the roller 15 carried at its upper end will contact the cam face 25, thereby disengaging the dog 13 from the ratchet-wheel, whence the upward spring action exerted by the coiled spring on said dog, will further elevate the dog until the pin 14 rests in the offset 23 in the cam groove 22. The depending stop 26 will contact the lug 27 on the wheel-support and limit further counter-clockwise movement of said wheel-support. When raising the plow manually, the lever 30 is swung down, and since the catch 33 contacts the lug 32, the wheel-support is pivoted with the hand lever, counter-clockwise, thus raising the plow from the ground. When the plow beam is raised and is being drawn, the strain of carrying said beam raised is taken by the lugs 26 and 27, and therefore takes the strain from the pin 14 and cam grooved arm 21.

I claim as my invention:

1. A plow, comprising a frame, a plow beam pivotally connected to the frame and capable of a vertical movement, a wheel for the plow beam, a support for the wheel pivoted to the beam, a lug on said support adapted to contact with a projection carried by the beam when said beam is in its raised position, and means for raising and lowering the plow beam.

2. A plow, comprising a frame, a plow beam pivotally connected to the frame and capable of a vertical movement, a wheel for the plow beam, a support for the wheel pivoted to the beam, a lug on said support located below the pivotal support of the said wheel-support and adapted to contact with a projection carried by the beam when said beam is in its raised position, and means for raising and lowering the plow beam.

3. A plow, comprising a frame, a plow beam pivotally connected to the frame and capable of a vertical movement, a wheel for the plow beam, a support for the wheel pivoted to the beam, a lug formed with said support, a hand lever, a toothed-segment for the hand lever, and a movable stop carried by said hand lever and adapted to engage said lug.

In testimony whereof I have hereunto set my hand in presence of two subscribing witnesses.

LEWIS E. WATERMAN.

Witnesses:
A. O. BEHEL,
JOHN F. McCANNA, Jr.